(12) United States Patent
Menon et al.

(10) Patent No.: US 8,144,814 B2
(45) Date of Patent: Mar. 27, 2012

(54) SIGNAL QUALITY ESTIMATOR

(75) Inventors: Murali Paravath Menon, Somerville, MA (US); Mark S. Wallace, Bedford, MA (US)

(73) Assignee: QUALCOMM Incorporated, San Diego, CA (US)

( * ) Notice: Subject to any disclaimer, the term of this patent is extended or adjusted under 35 U.S.C. 154(b) by 984 days.

(21) Appl. No.: 11/750,769

(22) Filed: May 18, 2007

(65) Prior Publication Data

US 2007/0274417 A1     Nov. 29, 2007

Related U.S. Application Data

(60) Provisional application No. 60/802,630, filed on May 22, 2006.

(51) Int. Cl.
 *H03D 3/00* (2006.01)
 *H03K 9/06* (2006.01)
(52) U.S. Cl. ........................................ 375/322
(58) Field of Classification Search ................. 375/227, 375/244, 254, 261, 267, 278, 285, 322, 340, 375/346, 348; 455/143, 226.3, 303, 333, 455/434, 436
 See application file for complete search history.

(56) References Cited

U.S. PATENT DOCUMENTS

| | | | | |
|---|---|---|---|---|
| 5,812,600 A * | 9/1998 | Hess et al. | | 375/261 |
| 6,229,847 B1 * | 5/2001 | Schlosser | | 375/227 |
| 6,975,671 B2 * | 12/2005 | Sindhushayana et al. | | 375/144 |
| 7,016,401 B1 | 3/2006 | Smith et al. | | |
| 7,299,011 B2 | 11/2007 | Penther | | |
| 2003/0165157 A1 * | 9/2003 | Pollmann et al. | | 370/465 |
| 2004/0101035 A1 * | 5/2004 | Boer et al. | | 375/219 |
| 2005/0013391 A1 * | 1/2005 | Boer et al. | | 375/340 |
| 2005/0068918 A1 * | 3/2005 | Mantravadi et al. | | 370/328 |
| 2005/0075103 A1 * | 4/2005 | Hikokubo et al. | | 455/423 |
| 2005/0201499 A1 * | 9/2005 | Jonsson | | 375/348 |
| 2006/0067446 A1 * | 3/2006 | Maeda et al. | | 375/349 |

FOREIGN PATENT DOCUMENTS

FR      2742613      6/1997

(Continued)

OTHER PUBLICATIONS

International Search Report—PCT/US07/069492, International Searching Authority, European Patent Office, Dec. 10, 2007.

(Continued)

*Primary Examiner* — David C. Payne
*Assistant Examiner* — Syed Haider
(74) *Attorney, Agent, or Firm* — Qualcomm Patent Group; Dmitry R. Milikovsky; James H. Yancey, Jr.

(57) ABSTRACT

Techniques for estimating signal quality in a communication system are described. Scaled errors are obtained for inphase (I) and quadrature (Q) components of detected symbols. The scaled errors are determined based on a first function having higher resolution for small errors than large errors between the detected symbols and nearest modulation symbols. The first function may be a square root function or some other function that can provide good resolution for both low and high SNRs. The scaled errors for the I and Q components are combined to obtain combined scaled errors, which are averaged to obtain an average scaled error. A signal quality estimate is then determined based on the average scaled error and in accordance with a second function having non-linearity to compensate for the first function.

19 Claims, 9 Drawing Sheets

FOREIGN PATENT DOCUMENTS

| | | |
|---|---|---|
| JP | 7504072 | 4/1995 |
| JP | 11234354 A | 8/1999 |
| JP | 2002204183 A | 7/2002 |
| JP | 2004222260 A | 8/2004 |
| JP | 2005311583 A | 11/2005 |
| WO | WO03017510 A1 | 2/2003 |

OTHER PUBLICATIONS

Krishna Balachandran et al.: "Channel Quality Estimation and Rate Adaptation for Cellular Mobile Radio" IEEE Journal on Selected Areas in Communications, IEEE Service Center, Piscataway, US, vol.:17, No. 7, Jul. 1999, XP011054983.

Written Opinion—PCT/US07/069492, International Searching Authority—European Patent Office, Dec. 10, 2007.

Hori, et al., "A Definition of Transmit Modulation Accuracy for OFDM Systems," Technical Report of the Institute of Electronics, Information and Communication Engineers, Jan. 21, 1999, vol. 98, No. 535, pp. 15-20, RCS 98☐170.

* cited by examiner

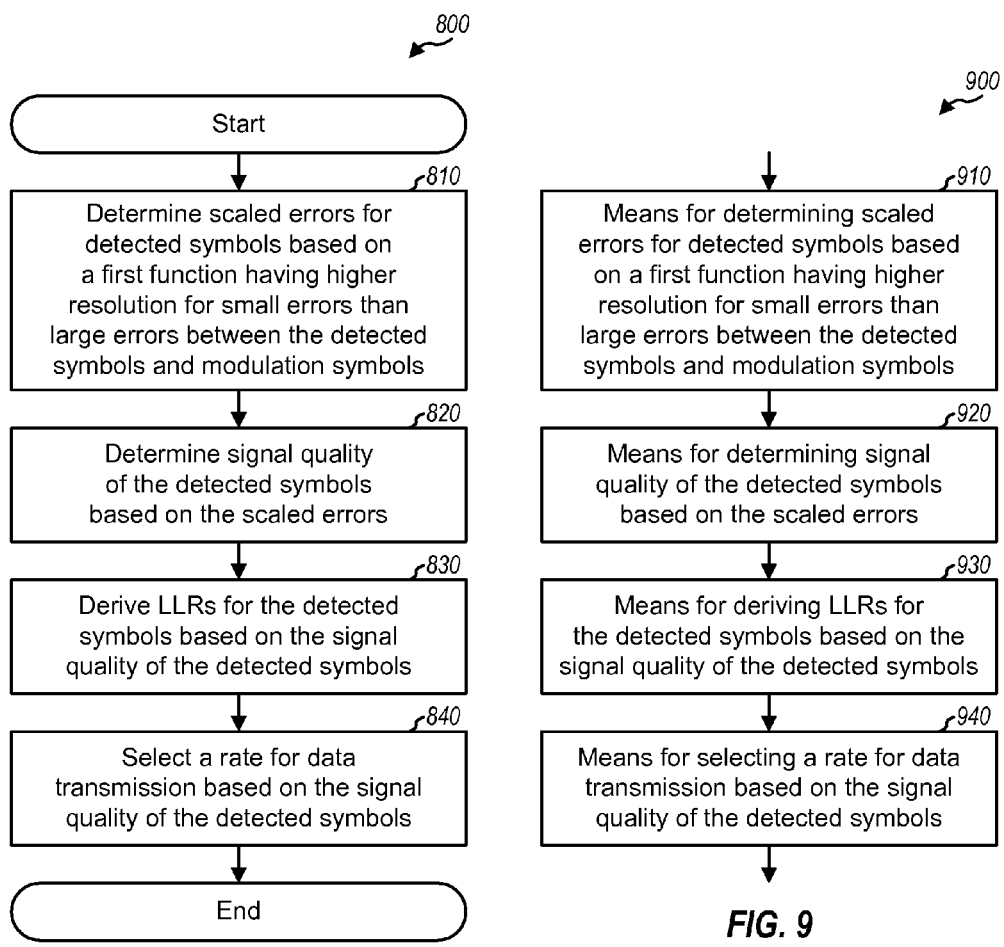

SIGNAL QUALITY ESTIMATOR

CLAIM OF PRIORITY UNDER 35 U.S.C. §119

The present Application for Patent claims priority to Provisional Application No. 60/802,630 entitled "SNR ESTIMATOR FOR MIMO OFDM USING QAM HARD DECISIONS" filed May 22, 2006, and assigned to the assignee hereof and hereby expressly incorporated by reference herein.

BACKGROUND

I. Field

The present disclosure relates generally to communication, and more specifically to techniques for estimating signal quality in a communication system.

II. Background

In a communication system, a transmitter typically processes (e.g., encodes and symbol maps) traffic data to generate data symbols, which are modulation symbols for data. The transmitter then processes the data symbols to generate a modulated signal and transmits this signal via a communication channel. The communication channel distorts the transmitted signal with a channel response and further degrades the signal with noise and interference. A receiver receives the transmitted signal and processes the received signal to obtain detected symbols, which are estimates of the transmitted data symbols. The receiver then processes (e.g., demodulates and decodes) the detected symbols to obtain decoded data.

The receiver typically estimates the quality of the received signal. Signal quality may be quantified by signal-to-noise ratio (SNR), signal-to-noise-and-interference ratio (SINR), energy-per-symbol-to-noise ratio (Es/No), and so on. The signal quality estimates may be used for various purposes. For example, the signal quality estimates may be used in the decoding process, e.g., to give greater weight to higher quality detected symbols and less weight to lower quality detected symbols. The signal quality estimates may also be used to select a suitable rate for data transmission. The system may support a set of rates, and each supported rate may require a certain minimum signal quality for reliable reception. The highest rate that can be reliably received may be selected based on the signal quality estimates. Accurate signal quality estimates may thus improve decoding performance, enhance throughput, reduce latency, and provide other benefits.

There is therefore a need in the art for techniques to accurately estimate signal quality in a communication system.

SUMMARY

Techniques for estimating signal quality in a communication system are described herein. In an embodiment, signal quality estimates (e.g., SNR estimates) are determined based on scaled errors for detected symbols. The scaled errors are determined based on a function that can provide good resolution for both low and high SNRs.

In an embodiment, scaled errors for detected symbols are determined based on a first function having higher resolution for small errors than large errors between the detected symbols and modulation symbols in a signal constellation. The first function may be a square root function, a logarithmic function, of some other function that can expand the dynamic range of small errors. Signal quality of the detected symbols is determined based on the scaled errors.

In an embodiment, scaled errors are obtained for inphase (I) and quadrature (Q) components of the detected symbols and are combined to obtain combined scaled errors. The combined scaled errors are averaged to obtain an average scaled error. A signal quality estimate is determined based on the average scaled error and in accordance with a second function having non-linearity to compensate for the first function. The signal quality estimate may be used to derive log-likelihood ratios (LLRs) for the detected symbols and/or to select a rate for data transmission.

Various aspects and embodiments of the disclosure are described in further detail below.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

FIG. 8 shows a process for deriving and using signal quality estimates.

FIG. 9 shows an apparatus for deriving and using signal quality estimates.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The signal quality estimation techniques described herein may be used for various communication systems such as Code Division Multiple Access (CDMA), Frequency Division Multiple Access (FDMA), Time Division Multiple Access (TDMA), Spatial Division Multiple Access (SDMA), Orthogonal FDMA (OFDMA), and Single-Carrier FDMA (SC-FDMA) systems. An OFDMA system utilizes Orthogonal Frequency Division Multiplexing (OFDM). An SC-FDMA system utilizes Single-Carrier Frequency Division Multiplexing (SC-FDM). OFDM and SC-FDM partition the system bandwidth into multiple (K) orthogonal subcarriers, which are also referred to as tones, bins, and so on. Each subcarrier may be modulated with data. In general, modulation symbols are sent in the frequency domain with OFDM and in the time domain with SC-FDM.

The techniques may also be used for single-input single-output (SISO), single-input multiple-output (SIMO), multiple-input single-output (MISO), and multiple-input multiple-output (MIMO) transmissions. Single-input refers to one transmit antenna and multiple-input refers to multiple transmit antennas for data transmission. Single-output refers to one receive antenna and multiple-output refers to multiple receive antennas for data reception. The techniques may also be used for various modulation schemes such as binary phase shift keying (BPSK), quadrature phase shift keying (QPSK), M-ary phase shift keying (M-PSK), quadrature amplitude modulation (QAM), Gaussian minimum shift keying (GMSK), continuous phase modulation (CPM), and so on.

Figure 1:
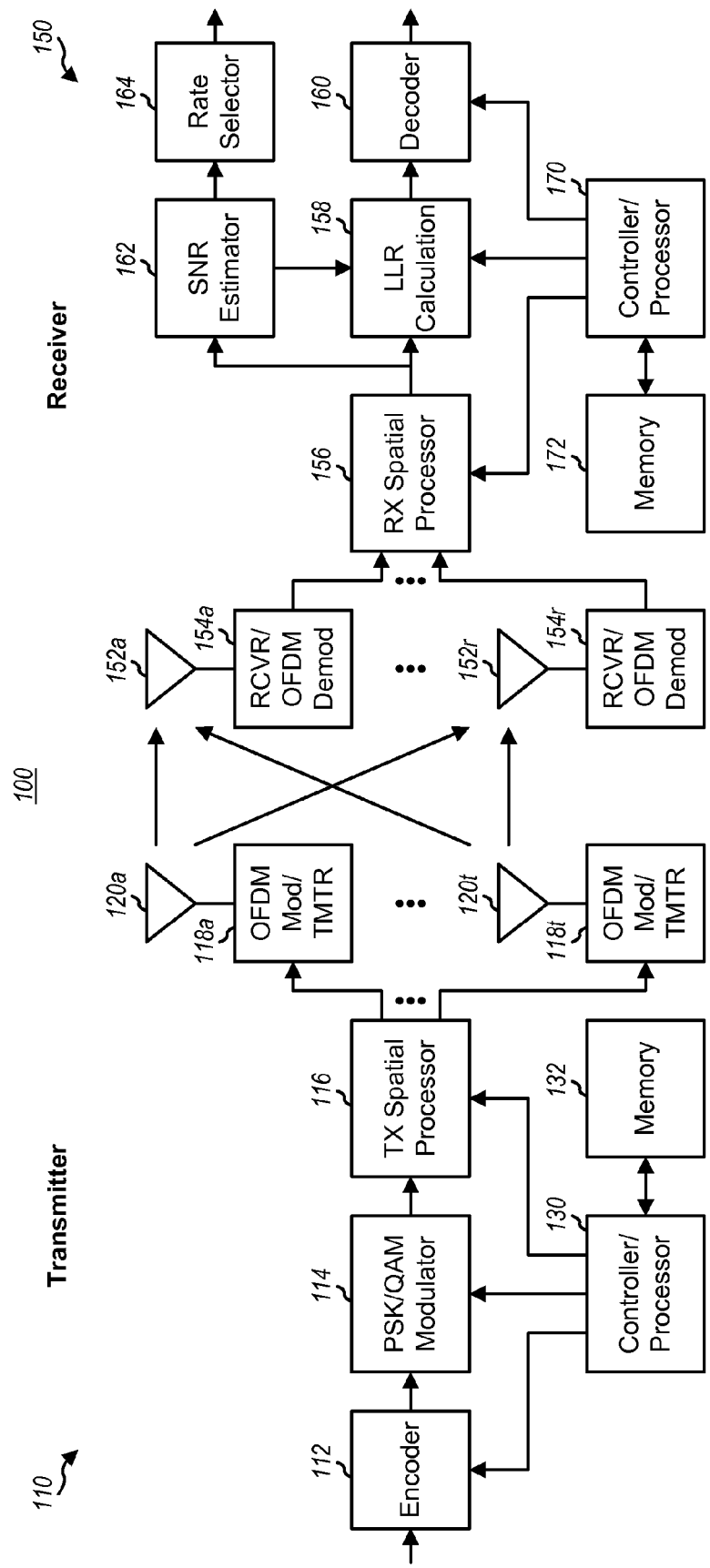
FIG. 1 shows a block diagram of a transmitter and a receiver.

FIG. 1 shows a block diagram of an embodiment of a transmitter 110 and a receiver 150 in a communication system 100. For downlink (or forward link), transmitter 110 may be part of a base station, an access point, a Node B, and/or some other network entity. Receiver 150 may be part of a terminal, a mobile station, a user equipment, a subscriber unit, and/or some other device. For uplink (or reverse link), transmitter 110 may be part of a terminal, a mobile station, a user equipment, and so on, and receiver 150 may be part of a base station, an access point, a Node B, and so on.

Transmitter 110 is equipped with multiple (T) transmit antennas, and receiver 150 is equipped with multiple (R) receive antennas. Each transmit antenna and each receive antenna may be a physical antenna or an antenna array. Transmitter 110 may transmit S data streams simultaneously from the T transmit antennas to the R receive antennas for a MIMO transmission, where $1 \leq S \leq \min\{T, R\}$. The data streams may also be referred to as data symbol streams, spatial streams, output streams, or some other terminology. For clarity, much of the description below is for an embodiment in which each data stream is sent on one spatial channel, and data stream and spatial channel are used interchangeably. In an embodiment, the S data streams are sent at the same rate. In another embodiment, each data stream may be sent at a rate selected for that data stream. In both embodiments, a rate may indicate a data rate or information bit rate, a coding scheme or code rate, a modulation scheme, a packet size, and/or other parameters. A rate may also be referred to as a packet format, a transport format, or some other terminology.

At transmitter 110, an encoder 112 receives and encodes traffic data for each data stream in accordance with a selected coding scheme and generates code bits. The coding scheme may comprise a convolutional code, a Turbo code, a low density parity check (LDPC) code, a cyclic redundancy check (CRC) code, a block code, and so on, or a combination thereof. Encoder 112 also performs interleaving on the code bits. A PSK/QAM modulator 114 maps the code bits for each data stream in accordance with a selected modulation scheme and provides data symbols, which are modulation symbols for data. Modulator 114 groups each set of B code bits to form a B-bit binary value, where $B \geq 1$, and further maps each B-bit value to a specific modulation symbol based on the selected modulation scheme, which may be BPSK, QPSK, M-PSK, or M-QAM, where $M=2^B$. Each modulation symbol is a complex value in a signal constellation for the selected modulation scheme. The coding scheme and modulation scheme for each data stream may be determined by the rate for that data stream.

A TX spatial processor 116 multiplexes the data symbols with pilot symbols, which are modulation symbols for pilot. TX spatial processor 116 performs spatial processing on the data symbols and/or pilot symbols and provides T output symbol streams to T OFDM modulators/transmitters (OFDM Mod/TMTR) 118a through 118t. TX spatial processor 116 may map the data symbols for each data stream to one transmit antenna or all T transmit antennas. Each OFDM modulator 118 performs OFDM modulation on its output symbol stream and generates OFDM symbols. Transmitter 118 processes (e.g., converts to analog, filters, amplifies, and upconverts) the OFDM symbols and generates a modulated signal. T modulated signals from transmitters 118a through 118t are transmitted from antennas 120a through 120t, respectively.

At receiver 150, R antennas 152a through 152r receive the T modulated signals from transmitter 110, and each antenna 152 provides a received signal to a respective receiver/OFDM demodulator (RCVR/OFDM Demod) 154. Each receiver 154 processes (e.g., filters, amplifies, downconverts, digitizes) its received signal and provides samples. Each OFDM demodulator 154 performs OFDM demodulation on the samples and provides received symbols to a receive (RX) spatial processor 156. RX spatial processor 156 estimates the MIMO channel response based on received pilot symbols and/or received data symbols. RX spatial processor 156 further performs MIMO detection on the received data symbols with the channel estimates and provides detected symbols. RX spatial processor 156 may implement minimum mean square error (MMSE), zero-forcing (ZF), successive interference cancellation (SIC), or some other MIMO detection technique. A unit 158 calculates LLRs for code bits based on the detected symbols from RX spatial processor 156 and SNR estimates from an SNR estimator 162. The LLRs indicate the reliability of the code bits. A decoder 160 deinterleaves and decodes the LLRs and provides decoded data.

SNR estimator 162 estimates the signal quality of each data stream based on the detected symbols, as described below. For clarity, SNR is used to denote signal quality in much of the description below. A rate selector 164 selects one or more rates for the S data streams based on the SNR estimates. Although not shown in FIG. 1, receiver 150 may send the selected rate(s) and/or other feedback information to transmitter 110. Transmitter 110 may control the data transmission to receiver 150 based on the feedback information.

Controllers/processors 130 and 170 control the operation at transmitter 110 and receiver 150, respectively. Memories 132 and 172 store data and program codes for transmitter 110 and receiver 150, respectively.

In general, receiver 150 may derive SNR estimates based on pilot symbols, data symbols, or both pilot and data symbols. In an embodiment, receiver 150 derives SNR estimates based on hard decisions of the detected symbols. The modulation scheme used for each data stream is known, e.g., from signaling included in a header of each frame sent by transmitter 110. For a MIMO OFDM transmission, an SNR estimate may be derived for each subcarrier of each spatial channel used for transmission.

Figure 2:
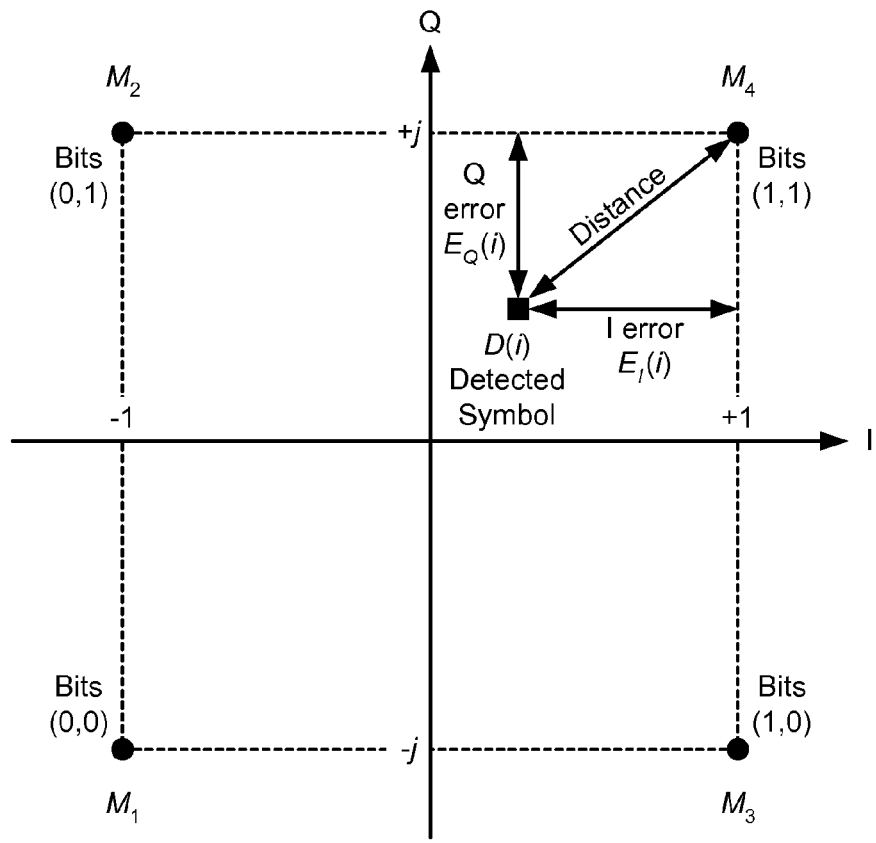
FIG. 2 shows a detected symbol in a signal constellation for QPSK.

FIG. 2 shows an exemplary signal constellation for QPSK. This signal constellation includes four signal points corresponding to four possible QPSK modulation symbols of $M_1$, $M_2$, $M_3$ and $M_4$. Each modulation symbol is a complex value having a inphase (I) component and a quadrature (Q) component. In the description herein, the terms "inphase", "I" and "real" are synonymous, and the terms "quadrature", "Q" and "imaginary" are also synonymous. Modulation symbol $M_1$ has a complex value of $-1-j$ and is selected by code bit pair (0, 0), modulation symbol $M_2$ has a complex value of $-1+j$ and is selected by code bit pair (0, 1), modulation symbol $M_3$ has a complex value of $+1-j$ and is selected by code bit pair (1, 0), and modulation symbol $M_4$ has a complex value of $+1+j$ and is selected by code bit pair (1, 1), where $j=\sqrt{-1}$. One of the four modulation symbols is transmitted for code bit pair (a, b), with the transmitted modulation symbol being determined by the values of code bits a and b.

FIG. 2 also shows one detected symbol D(i) at receiver 150. Due to noise and other deleterious effects, detected symbol D(i) may have any complex value and may not lie directly on one of the four possible QPSK modulation symbols. A hard decision may be made for detected symbol D(i), and the nearest modulation symbol $M_4$ may be provided as the modulation symbol that is most likely to have been transmitted. Modulation symbol $M_4$ may thus be hypothesized to have been transmitted and pushed to the location of detected symbol D(i) by noise. The distance between detected symbol D(i) and the nearest modulation symbol $M_4$ is indicative of the quality and reliability of detected symbol D(i). In general, the quality of a detected symbol is higher for a shorter distance to the nearest modulation symbol and is lower for a larger distance.

An SNR estimate may be derived by a ratio of signal power to noise power. The signal power is equal to the square of the distance from the center of the signal constellation to a modulation symbol in the signal constellation. The signal power is a constant value and is equal to 2 for the signal constellation shown in FIG. 2. The noise power may be estimated by averaging the squared distance between the detected symbols and the nearest modulation symbols. SNR calculation is typically performed with a fixed number of bits, e.g., L bits. With a square function, a large portion of the total range from 0 to $2^L-1$ would be used to represent large distances corresponding to low SNRs, and only a small portion of the total range would be used to represent small distances corresponding to high SNRs. This results in poor dynamic range for the SNR estimate. In particular, since SNR is inversely related to the squared distance and since a large portion of the total range is used for large distances, resolution is better for low SNRs but is worse for high SNRs.

In an embodiment, the errors between the detected symbols and the nearest modulation symbols are represented using a mapping function that can provide good resolution for both low and high SNRs. In an embodiment, the mapping function is a square root function. In other embodiments, the mapping function may be a logarithmic function, a linear function, a tan h function, or some other function. In general, any function having equal or higher resolution for small errors than large errors may be used as the mapping function. For clarity, much of the following description is for the embodiment in which the mapping function is a square root function.

Figure 3:
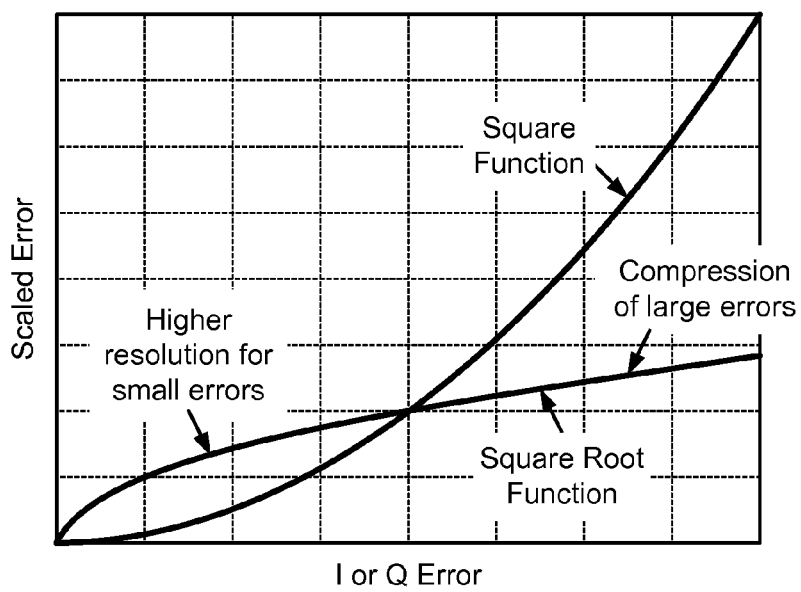
FIG. 3 shows scaled error for a square function and a square root function.

FIG. 3 shows plots of scaled error versus I or Q error for a square function and a square root function. The square root function provides higher resolution for small errors and compresses large errors. These characteristics effectively expand the dynamic range for small errors and provide better resolution for high SNRs. In contrast, the square function utilizes most of the total range for large errors and a small range for small errors, which results in smaller dynamic range and poor resolution for high SNRs.

A detected symbol may be denoted as $D(i)=D_I(i)+jD_Q(i)$, where $D_I(i)$ is an I value, $D_Q(i)$ is a Q value, and i is an index for detected symbols used for SNR estimation. The nearest modulation symbol may be denoted as $M(i)=M_I(i)+jM_Q(i)$. In the example shown in FIG. 2, the nearest modulation symbol is $M_4$, or $M(i)=M_4$. The error between the detected symbol and the nearest modulation symbol, in linear unit, may be expressed as:

$$E_I(i)=\text{abs}\{D_I(i)-M_I(i)\} \text{ and} \quad \text{Eq (1)}$$

$$E_Q(i)=\text{abs}\{D_Q(i)-M_Q(i)\}$$

where $E_I(i)$ is the I error, which is the error in the I component, and
$E_Q(i)$ is the Q error, which is the error in the Q component.

In an embodiment, the scaled error for the detected symbol may be expressed as:

$$X_I(i)=G\cdot\sqrt{E_I(i)}, \text{ and}$$

$$X_Q(i)=G\cdot\sqrt{E_Q(i)}, \quad \text{Eq (2)}$$

where
$X_I(i)$ is the scaled error in the I component,
$X_Q(i)$ is the scaled error in the Q component, and
G is a scale factor.

The range of errors may be larger for a signal constellation with few signal points (e.g., BPSK or QPSK) and smaller for a signal constellation with many signal points (e.g., 64-QAM or 256-QAM). Different scale factors may be used for different modulation schemes and may be selected such that the average scaled error lies in approximately the same range for all modulation schemes.

Figure 4A:
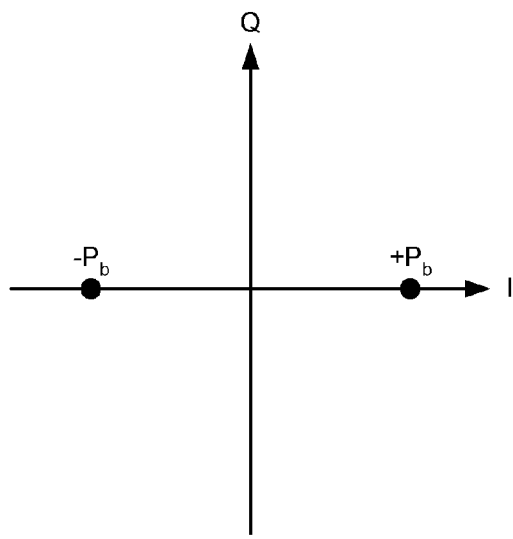
FIGS. 4A through 4E show signal constellations for five modulation schemes.

FIG. 4A shows a signal constellation for BPSK. This signal constellation has two signal points on the real or I axis at $P_b+j0$ and $-P_b+j0$, where $P_b$ is a suitably selected value. Alternatively, the two signal points may be defined on the imaginary or Q axis.

Figure 4B:
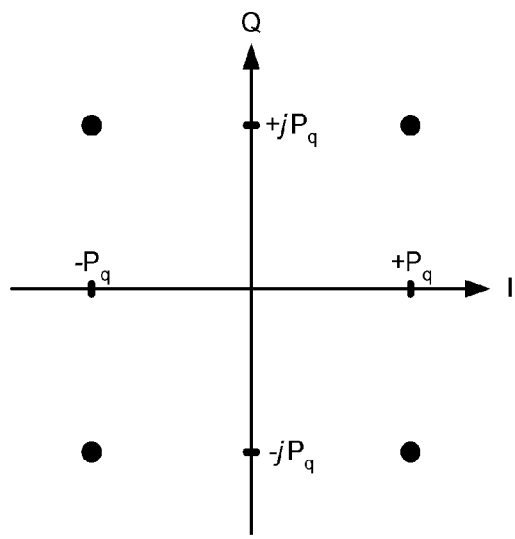

FIG. 4B shows a signal constellation for QPSK. This signal constellation has four signal points at $\pm P_q$ on the real axis and $\pm P_q$ on the imaginary axis, where $P_q$ is a suitably selected value.

Figure 4C:
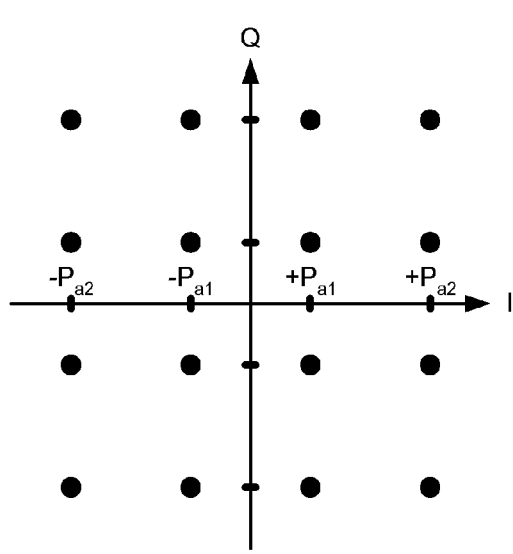

FIG. 4C shows a signal constellation for 16-QAM. This signal constellation has 16 signal points at $\pm P_{a1}$ and $\pm P_{a2}$ on both the real and imaginary axes, where Pal and $P_{a2}$ are suitably selected values.

Figure 4D:
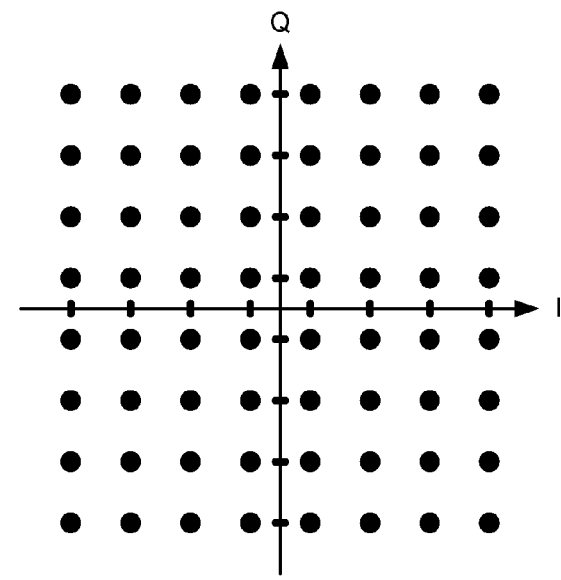

FIG. 4D shows a signal constellation for 64-QAM. This signal constellation has 64 signal points at $\pm P_{b1}$, $\pm P_{b2}$, $\pm P_{b3}$ and $\pm P_{b4}$ on both the real and imaginary axes (not labeled in FIG. 4D), where $P_{b1}$ through $P_{b4}$ are suitably selected values.

Figure 4E:
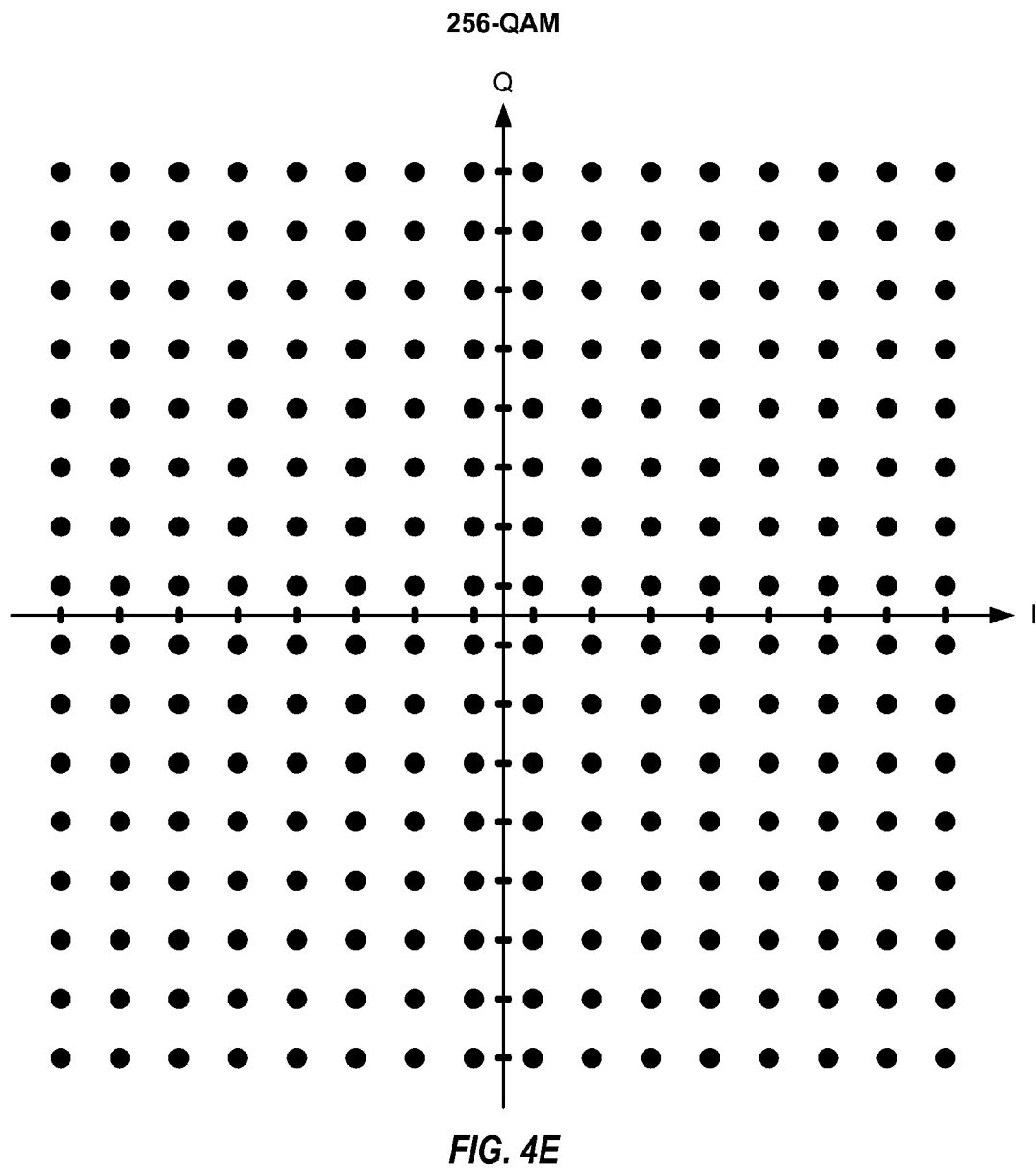

FIG. 4E shows a signal constellation for 256-QAM. This signal constellation has 256 signal points at $\pm P_{c1}$, $\pm P_{c2}$, $\pm P_{c3}$, $\pm P_{c4}$, $\pm P_{c5}$, $\pm P_{c6}$, $\pm P_{c7}$ and $P_{c8}$ on both the real and imaginary axes (not labeled in FIG. 4E), where $P_{c1}$ through $P_{c8}$ are suitably selected values.

As shown in FIG. 4A, the signal constellation for BPSK is not symmetrical for the real and imaginary axes. The real axis has a nominal value of $\pm P_b$ whereas the imaginary axis has a nominal value of zero. Thus, the distribution of errors for the I component is different from the distribution of errors for the Q component.

As shown in FIGS. 4B through 4E, the signal constellations for QPSK and M-QAM are symmetrical for the real and imaginary axes. Hence, 90° shifted versions of these signal constellations look the same as the original signal constellations. Thus, the distribution of errors for the I component is the same as the distribution of errors for the Q component.

Receiver 150 digitizes each received signal and performs various processing on the samples to obtain detected symbols. Each detected symbol may be represented by an L-bit value for the I component (or I value) and another L-bit value for the Q component (or Q value), where L may be any number of bits. Receiver 150 also typically performs automatic gain control (AGC) so that the average power of the detected symbols is at a predetermined setpoint. In general, the distributions of I and Q values at receiver 150 are dependent on the number of bits L and the AGC setpoint. In an embodiment that is described below, L=9, the I values and Q values for the detected symbols range from 0 to 511, and 256 represents a signal value of zero.

Figure 5A:
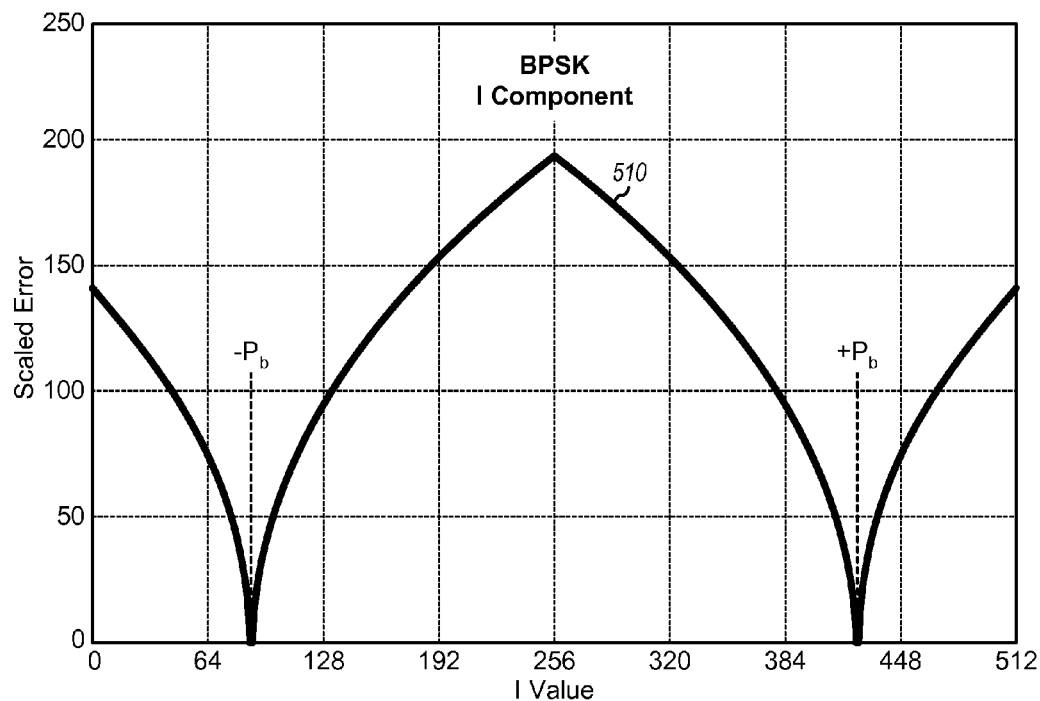
FIGS. 5A through 5F show scale error functions for five modulation schemes.

FIG. 5A shows a plot 510 of scale error versus I value for BPSK. The scale error is zero when the I value is either $+P_b$ or $-P_b$ and increases as the I value moves away from $+P_b$ or $-P_b$.

Figure 5B:
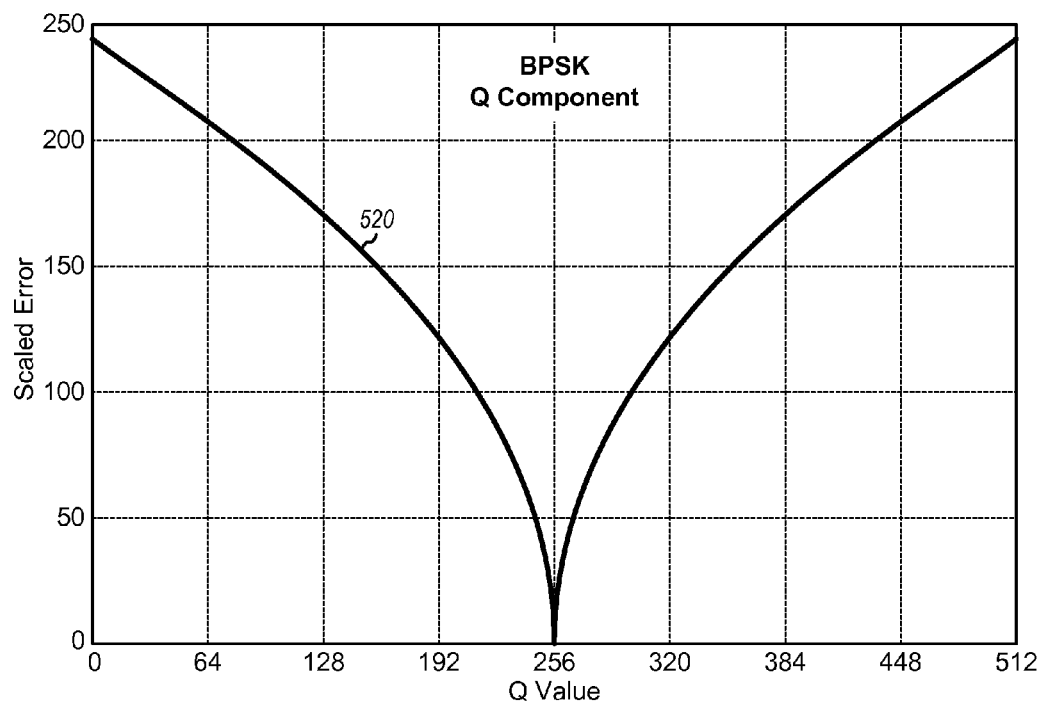

FIG. 5B shows a plot 520 of scale error versus Q value for BPSK. The scale error is zero when the Q value is at midscale, which is the nominal value, and increases as the Q value moves away from midscale.

Figure 5C:
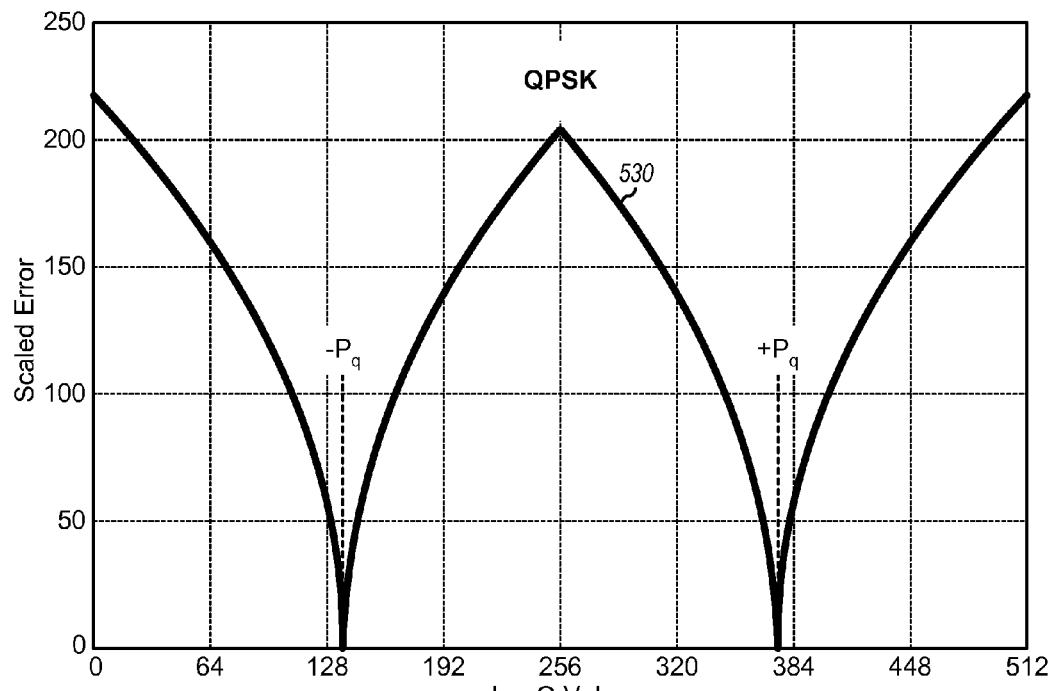

FIG. 5C shows a plot 530 of scale error versus I or Q value for QPSK. The scale error is zero when the I or Q value is either $+P_q$ or $-P_q$ and increases as the I or Q value moves away from $+P_q$ or $-P_q$.

Figure 5D:
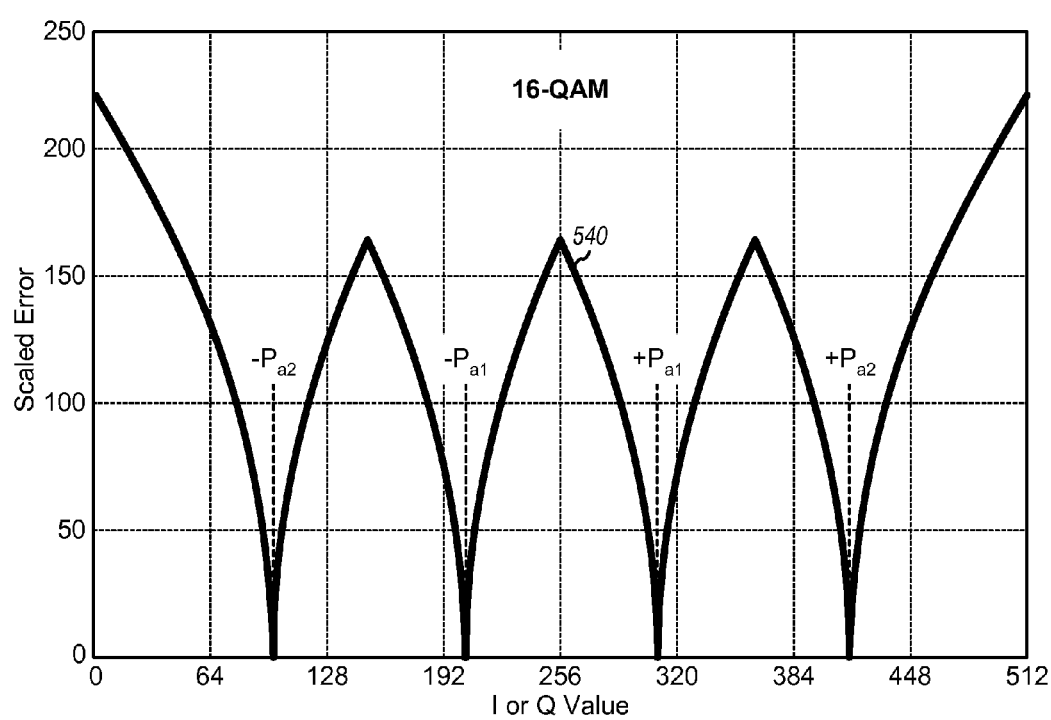

FIG. 5D shows a plot 540 of scale error versus I or Q value for 16-QAM. The scale error is zero when the I or Q value is $\pm P_{a1}$ or $\pm P_{a2}$ and increases as the I or Q value moves away from these points.

Figure 5E:
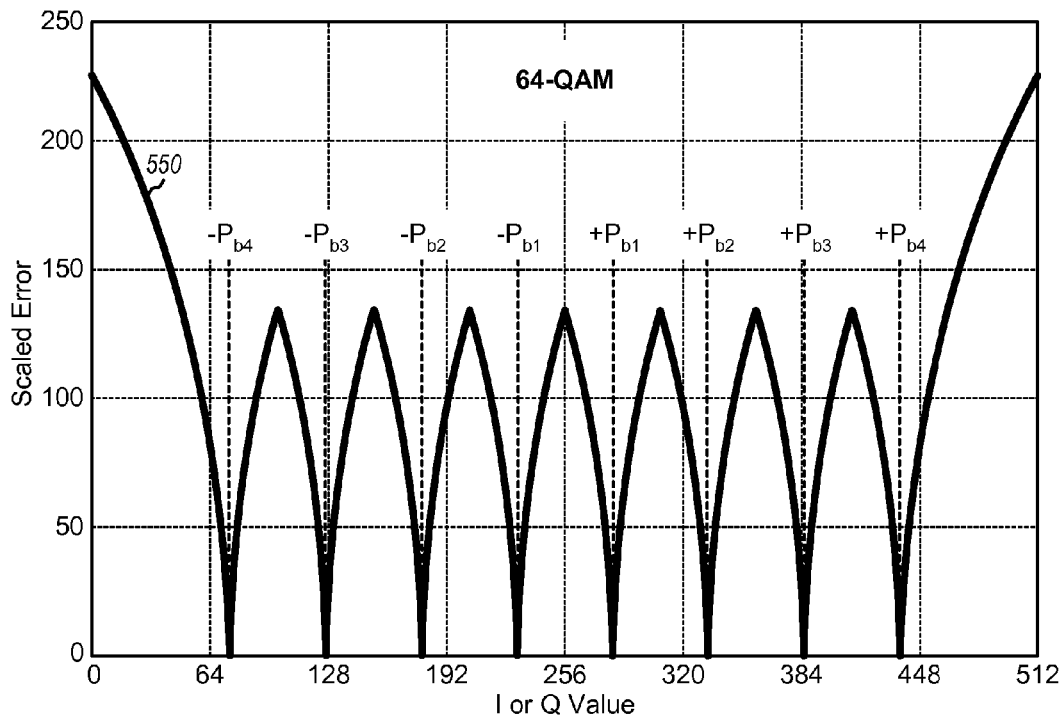

FIG. 5E shows a plot 550 of scale error versus I or Q value for 64-QAM. The scale error is zero when the I or Q value is $\pm P_{b1}$, $\pm P_{b2}$, $\pm P_{b3}$ or $\pm P_{b4}$ and increases as the I or Q value moves away from these points.

Figure 5F:
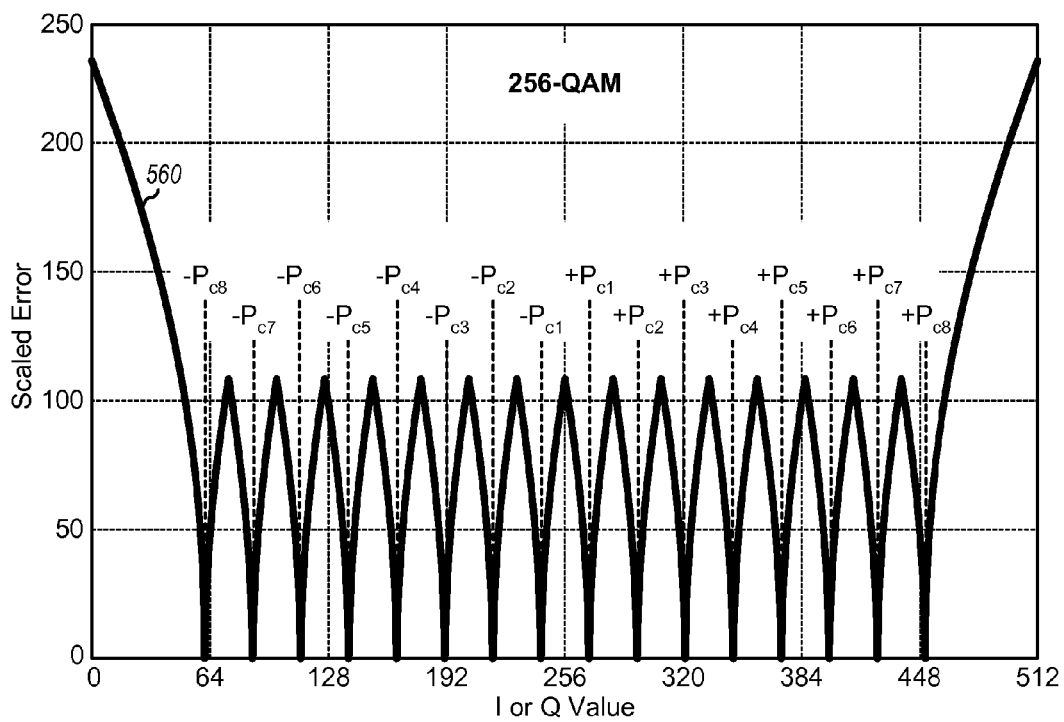

FIG. 5F shows a plot 560 of scale error versus I or Q value for 256-QAM. The scale error is zero when the I or Q value is $\pm P_{c1}$, $\pm P_{c2}$, $\pm P_{c3}$, $\pm P_{c4}$, $\pm P_{c5}$, $\pm P_{c6}$, $\pm P_{c7}$, or $\pm P_{c8}$ and increases as the I or Q value moves away from these points.

FIGS. 5A through 5F show exemplary scaled error functions for different modulation schemes. For each scaled error function, the scaled error may be calculated for each possible I or Q value (or each signal level) as follows. For each I or Q value, the nominal value of the closest modulation symbol is determined, which is equivalent to making a hard decision. The difference between this nominal value and the I or Q value is determined, as shown in equation set (1). The square root of the difference is then determined and multiplied by a scale factor to produce the scaled error for that I or Q value, as shown in equation set (2). The same calculation may be repeated for each possible I or Q value In general, the scaled errors may be computed using hardware, firmware, and/or software. In an embodiment, look-up tables are used to store the scale errors for different possible I and Q values. One look-up table may be used for each modulation scheme with symmetric I and Q components, such as QPSK and M-QAM, since the scaled error function for 1 is the same as the scaled error function for Q. Two look-up tables may be used for each modulation scheme with asymmetric I and Q components, such as BPSK, since the scaled error functions for I and Q are different. For example, six look-up tables may be used to store the six scaled error functions shown in FIGS. 5A through 5F. Each look-up table stores the scaled error for each possible I or Q value for a specific modulation scheme.

The scaled errors for the I and Q components of detected symbol D(i) may be combined, as follows:

$$X(i)=X_I(i)+X_Q(i), \quad \text{Eq (3)}$$

where X(i) is a combined scaled error for detected symbol D(i).

The combined scaled errors for different detected symbols may be averaged as follows:

$$X_{avg}(n) = \frac{1}{N} \cdot \sum_{i=nN}^{(n+1)N-1} X(i), \quad \text{Eq (4)}$$

where $X_{avg}(n)$ is the average scaled error for time interval n,

N is the accumulation length, $n=\lfloor i/N \rfloor$ is an index for time interval, and $\lfloor \; \rfloor$ denotes a floor operator that provides the next lower integer value.

The accumulation length N may be selected to provide good performance.

The average scaled error may be mapped to an SNR value based on a function of SNR versus scaled error, which is also referred to as an SNR function. The SNR function may be determined by computer simulation, empirical measurement, and/or other means. A different SNR function may be determined for each modulation scheme. In an embodiment, look-up tables are used to store SNR values for different average scaled error values. Each look-up table stores an SNR value for each possible average scaled error value for a specific modulation scheme.

Figure 6:
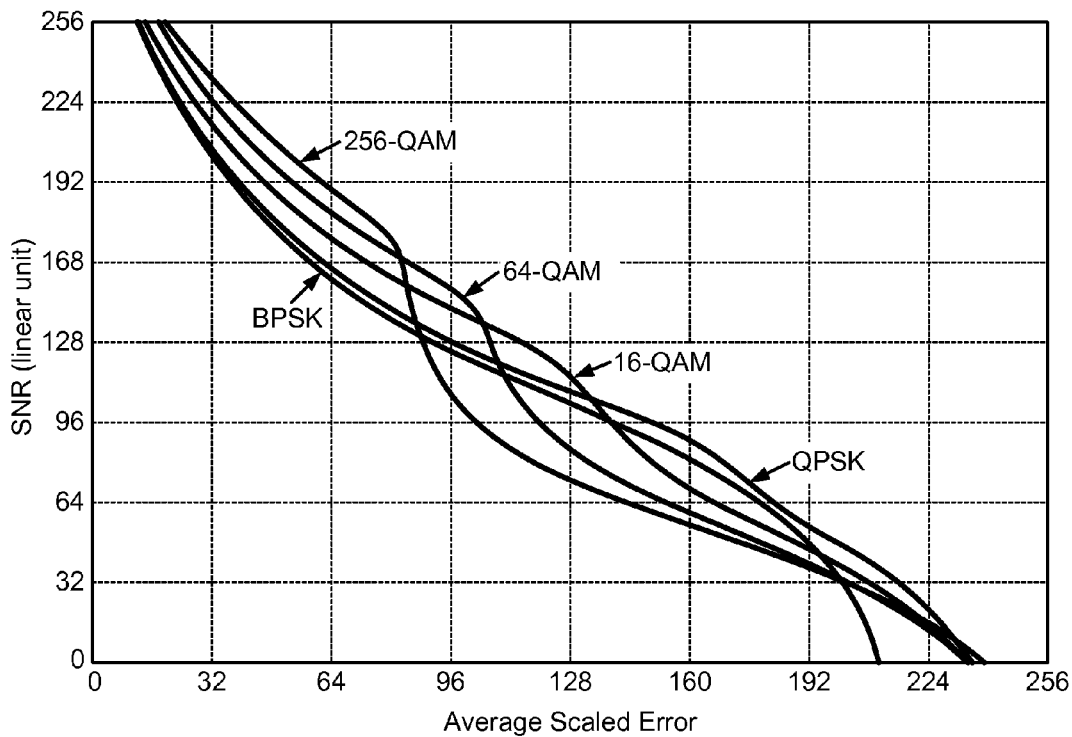
FIG. 6 shows SNR functions for five modulation schemes.

FIG. 6 shows plots of five exemplary SNR functions for BPSK, QPSK, 16-QAM, 64-QAM, and 256-QAM. These SNR functions are nonlinear. The non-linearity compensates for the square root function used to generate the scaled errors and produces accurate SNR estimates for different modulation schemes.

The use of a square root function for the scaled errors may provide various advantages. The square root function expands small I and Q errors, which results in better dynamic range and lower quantization errors for high SNRs. The square root function also provides improved accuracy for SNR measurements due to lower quantization errors. The square root function also emphasizes the scaled error when the I or Q value lies above the nominal level.

In general, various scaled error functions may be used to generate scaled errors for I and Q components of detected symbols. The scaled error functions are matched to the signal constellations of the modulation schemes used for data transmission. Various SNR functions may also be used to generate SNR estimates based on the average scaled error. The SNR functions are matched to the scaled error functions. The SNR functions and scaled error functions may be determined by computer simulations, empirical measurements, and/or other means.

Figure 7:
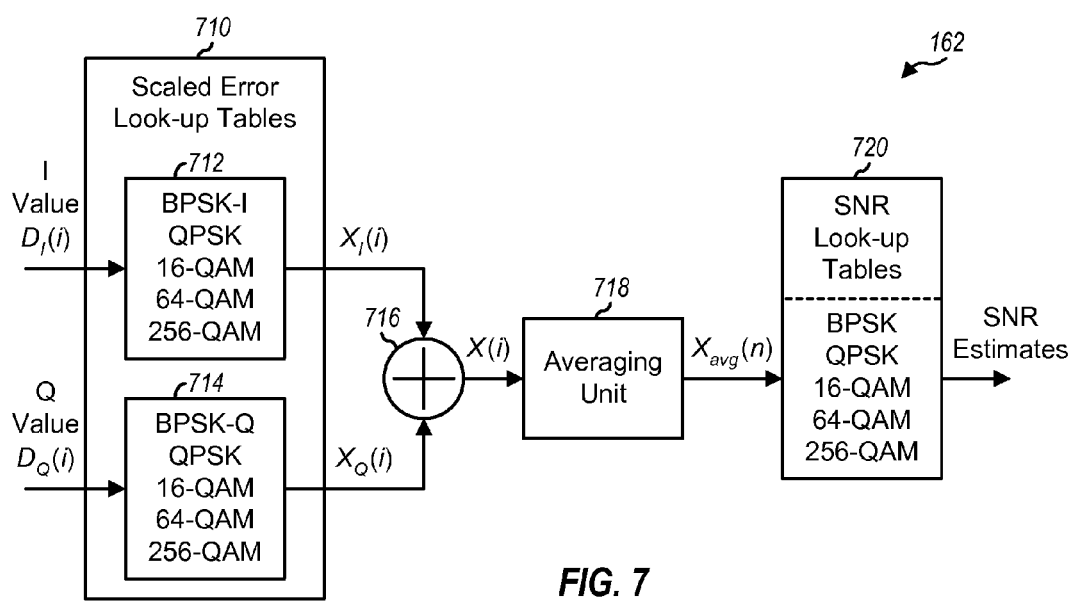
FIG. 7 shows a block diagram of an SNR estimator at the receiver.

FIG. 7 shows a block diagram of an embodiment of SNR estimator 162 in FIG. 1. Within SNR estimator 162, scaled error look-up tables 710 includes a look-up table 712 for I component and a look-up table 714 for Q component. Look-up table 712 receives the I value for each detected symbol and provides a scaled error for that I value. Look-up table 712 may implement the scaled error functions shown in FIGS. 5A and 5C through 5F. Look-up table 714 receives the Q value for each detected symbol and provides a scaled error for that Q value. Look-up table 714 may implement the scaled error functions shown in FIGS. 5B through 5F. Six look-up tables may implement the six scaled error functions shown in FIGS. 5A through 5F and may be used for both I and Q values in a time-shared manner. A summer 716 sums the scaled errors for the I and Q components of each detected symbol, e.g., as shown in equation (3). A unit 718 computes the average of the combined scaled errors for a group of N detected symbols and provides an average scaled error for the group. An SNR look-up table 720 receives the average scaled error and provides a corresponding SNR value for the group of detected symbols.

In an embodiment, the I and Q values are 9-bit values, the scaled errors are 8-bit values, and each of the six scaled error look-up tables has a size of 512×8. In an embodiment, the average scaled error is an 8-bit value, the SNR estimate is also an 8-bit value, and each of the five SNR look-up tables has a size of 256×8. Other bit-widths may also be used for the I and Q values, the scaled errors, the average scaled error, and the SNR estimates.

FIG. 7 shows an embodiment of SNR estimator 162. In general, SNR estimation may be performed with hardware, firmware, and/or software. The scaled error functions and SNR functions may be implemented with look-up tables or may be calculated using hardware, firmware, and/or software.

For a SISO, SIMO or MISO OFDM transmission, only one spatial channel is available for transmission, and an SNR estimate may be obtained for each subcarrier used for transmission. For a MIMO OFDM transmission, multiple spatial channels may be available for transmission, and an SNR estimate may be obtained for each subcarrier of each spatial channel used for transmission.

Referring to FIG. 1, LLR computation unit 158 may use the SNR estimates to compute LLRs for the detected symbols from RX spatial processor 156. Unit 158 may compute the LLRs jointly for a group of detected symbols, which may be for one subcarrier of all spatial channels, all subcarriers of one spatial channel, or some other combination of subcarriers and spatial channels. Unit 158 may also compute LLRs independently for each detected symbol.

Unit 158 may compute LLRs for B code bits $b_1(i)$ through $b_B(i)$ of detected symbol D(i) in accordance with a max-log-MAP detector, as follows:

$$L(b_l(i)) \approx \frac{1}{2} \cdot \max_{\underline{b}(i):b_l(i)=+1} \left\{ -\frac{1}{\sigma^2} \cdot |D(i) - \tilde{M}(i)|^2 + \underline{b}_l^T(i) \cdot \underline{L}_l(i) \right\} \quad \text{Eq (5)}$$
$$- \frac{1}{2} \cdot \max_{\underline{b}(i):b_l(i)=-1} \left\{ -\frac{1}{\sigma^2} \cdot |D(i) - \tilde{M}(i)|^2 + \underline{b}_l^T(i) \cdot L_l(i) \right\}.$$

where

S(i) is a data symbol sent by transmitter 110 and unknown at receiver 150, $\tilde{M}(i)$ is a data symbol hypothesized to have been sent for data symbol S(i), b(i) is a vector with all B code bits for data symbol S(i), $\overline{b}_l(i)$ is a vector with all code bits in b(i) except for code bit $B_l(i)$, $L_l(i)$ is a vector with a priori LLRs for all code bits in $\underline{b}_l(i)$, $\overline{L}(b_l(i))$ is the LLR for code bit $B_l(i)$, $\sigma^2$ is the variance of the noise, and "$T$" denotes a transpose.

Equation (5) is evaluated for each code bit $B_l(i)$, for l= 1, ..., B, for detected symbol D(i). For each code bit $B_l(i)$, $2^B$ hypothesized bit vectors b(i) for all possible sets of code bits $b_1(i)$ through $b_B(i)$ that might have been transmitted for data symbol S(i) are considered. Each hypothesized bit vector b(i) has a corresponding hypothesized data symbol $\tilde{M}(i)$. The expression within the max{ } operation is computed for each hypothesized bit vector b(i) to obtain a result for that vector. The results for the $2^{B-1}$ hypothesized bit vectors b(i) with $b_l(i)=+1$ are used in the first max{ } operation. The results for the $2^{B-1}$ hypothesized bit vectors b(i) with be $b_l(i)=-1$ are used in the second max{ } operation. The SNR estimate is used for $1/\sigma^2$ in equation (5).

In another embodiment, a set of LLR look-up tables is used to compute LLRs, with each LLR look-up table being determined for a different SNR. The SNR estimate may be quantized to a predetermined number of bits (e.g., three bits). The quantized SNR is then used to select one of the LLR look-up tables for computing the LLRs for the detected symbols. Unit 158 may also compute LLRs in other manners using the SNR estimates. The SNR estimates may also be used to generate soft decisions in other formats besides LLR.

Rate selector 164 may select a suitable rate for each data stream based on the SNR estimates for that data stream. In an embodiment, each data stream is sent on all K subcarriers of one spatial channel. The rate for each data stream may be determined as follows. The SNR estimates from SNR estimator 162 may be converted to decibel (dB), as follows:

$$SNR_m(k)=10\cdot\log_{10}(\gamma_m(k)), \quad \text{Eq (6)}$$

where $\gamma_m(k)$ is an SNR estimate for subcarrier k of spatial channel m in linear units, and $SNR_m(k)$ is an SNR estimate for subcarrier k of spatial channel m in dB.

An average SNR for each spatial channel may be computed as:

$$SNR_{avg,m} = \frac{1}{K} \cdot \sum_{k=1}^{K} SNR_m(k), \quad \text{Eq (7)}$$

where $SNR_{avg,m}$ is the average SNR of spatial channel m.

An effective SNR for each spatial channel may be computed as:

$$SNR_{eff,m}=SNR_{avg,m}-SNR_{bo,m}, \quad \text{Eq (8)}$$

where $SNR_{bo,m}$ is a backoff factor for spatial channel m, and $SNR_{eff,m}$ is the effective SNR for spatial channel m.

The backoff factor may account for variability in SNR estimates across subcarriers due to frequency selectivity, receive diversity order, packet errors, and/or other factors.

The system may support a set of rates. Each supported rate is associated with a specific spectral efficiency, a specific code rate, a specific modulation scheme, and a specific minimum SNR required to achieve 1% packet error rate (PER) for a non-fading, AWGN channel. For each rate, the required SNR may be obtained by computer simulation, empirical measurements, and so on based on the specific system design (e.g., the code rate, interleaving scheme, modulation scheme, and so on, used by the system for that rate) and for an AWGN channel. The effective SNR for each spatial channel may be compared against the set of required SNRs for the set of supported rates. The supported rate with the highest spectral efficiency and a required SNR that is less than or equal to the effective SNR may be selected for use.

If a single rate is used for all spatial channels, then rate selector 164 may average the SNR estimates across all spatial channels. Rate selector 164 may then derive an effective SNR for all spatial channels and select a single rate based on the effective SNR. Rate selector 164 may also perform rate selection in other manners.

Rate selector 164 may also select the number of spatial channels to use for data transmission based on the SNR estimates. Rate selector 164 may evaluate performance (e.g., throughput) of each possible number of spatial channels and select the number of spatial channels with the best performance (e.g., the highest throughput). Receiver 150 may send the selected number of spatial channels as well as their rates to transmitter 110 for use in the next transmission to the receiver.

FIG. 8 shows an embodiment of a process 800 for deriving and using signal quality estimates. Scaled errors for detected symbols are determined based on a first function having higher resolution for small errors than large errors between the detected symbols and modulation symbols (block 810). The first function may be a square root function, a logarithmic function, of some other function that can expand the dynamic range of small errors. The first function may also be dependent on the modulation scheme used for the detected symbols. Signal quality of the detected symbols is then determined based on the scaled errors (block 820). In an embodiment of block 810, scaled errors for I and Q components of the detected symbols are determined, e.g., using a look-up table of scaled error versus component value. In an embodiment of block 820, the scaled errors for the I and Q components are combined to obtain combined scaled errors. The combined scaled errors are then averaged to obtain an average scaled error. A signal quality estimate is determined based on the average scaled error and in accordance with a second function having non-linearity to compensate for the first function.

A look-up table of scaled error versus component value may be used for each modulation scheme supported by the system. The scaled errors may then be determined using a look-up table for the modulation scheme used for the detected symbols. A look-up table of signal quality estimate versus average scaled error may be used for each supported modulation scheme. The signal quality of the detected symbols may then be determined using a look-up table for the modulation scheme used for the detected symbols. The scaled errors and signal quality estimate may also be determined based on hardware, firmware and/or software.

For an OFDM transmission, detected symbols may be obtained for multiple subcarriers, and a signal quality estimate may be determined for each subcarrier based on scaled errors for detected symbols obtained on that subcarrier. For a MIMO OFDM transmission, detected symbols may be obtained for multiple subcarriers of multiple spatial channels, and a signal quality estimate may be determined for each subcarrier of each spatial channel based on scaled errors for detected symbols obtained on that subcarrier of that spatial channel.

LLRs for the detected symbols are determined based on the signal quality of the detected symbols (block 830). A rate is selected for data transmission based on the signal quality of the detected symbols (block 840). The number of spatial channels to use for data transmission may also be determined based on the signal quality of the detected symbols.

FIG. 9 shows an embodiment of an apparatus 900 for deriving and using signal quality estimates. Apparatus 900 includes means for determining scaled errors for detected symbols based on a first function having higher resolution for small errors than large errors between the detected symbols and modulation symbols (block 910), means for determining signal quality of the detected symbols based on the scaled errors (block 920), means for deriving LLRs for the detected symbols based on the signal quality of the detected symbols (block 930), and means for selecting a rate for data transmission based on the signal quality of the detected symbols (block 940).

The signal quality estimation techniques described herein may be implemented by various means. For example, these techniques may be implemented in hardware, firmware, software, or a combination thereof. For a hardware implementation, the processing units used to estimate signal quality may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The firmware and/or software codes may be stored in a memory (e.g., memory 172 in FIG. 1) and executed by a processor (e.g., processor 170). The memory may be implemented within the processor or external to the processor.

The previous description of the disclosed embodiments is provided to enable any person skilled in the art to make or use the disclosure. Various modifications to these embodiments will be readily apparent to those skilled in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. An apparatus comprising:
at least one processor configured to determine scaled errors for detected symbols based on a first function having higher resolution for small errors than large errors between the detected symbols and modulation symbols, and to determine signal quality of the detected symbols based on the scaled errors;
wherein the at least one processor is configured to determine scaled errors for inphase (I) and quadrature (Q) components of the detected symbols, to combine the scaled errors for the I and Q components to obtain combined scaled errors, to average the combined scaled errors to obtain an average scaled error, and to determine a signal quality estimate based on the average scaled error,
wherein the at least one processor is configured to determine the signal quality of the detected symbols based on a second function having non-linearity to compensate for the first function, and
a memory coupled to the at least one processor.

2. The apparatus of claim 1, wherein the first function is a square root function of errors between the detected symbols and nearest modulation symbols.

3. The apparatus of claim 1, wherein the first function is dependent on a modulation scheme used for the detected symbols.

4. The apparatus of claim 1, wherein the memory is configured to store a look-up table of scaled error versus inphase or quadrature value for the detected symbols.

5. The apparatus of claim 1, wherein the memory is configured to store multiple look-up tables of scaled error versus inphase or quadrature value for the detected symbols for multiple modulation schemes, and wherein the at least one processor is configured to determine the scaled errors using a look-up table for a modulation scheme used for the detected symbols.

6. The apparatus of claim 1, wherein the memory is configured to store a look-up table of signal quality estimate versus average scaled error.

7. The apparatus of claim 1, wherein the memory is configured to store multiple look-up tables of signal quality estimate versus average scaled error for multiple modulation schemes, and wherein the at least one processor is configured to determine the signal quality of the detected symbols using a look-up table for a modulation scheme used for the detected symbols.

8. The apparatus of claim 1, wherein the at least one processor is configured to obtain detected symbols for multiple subcarriers and to determine signal quality estimates for the multiple subcarriers based on the scaled errors.

9. The apparatus of claim 1, wherein the at least one processor is configured to obtain detected symbols for multiple subcarriers of multiple spatial channels and to determine signal quality estimates for the multiple subcarriers of the multiple spatial channels based on the scaled errors.

10. The apparatus of claim 9, wherein the at least one processor is configured to determine a signal quality estimate for each subcarrier of each spatial channel based on scaled errors for detected symbols obtained on the subcarrier of the spatial channel.

11. The apparatus of claim 1, wherein the at least one processor is configured to determine log-likelihood ratios for the detected symbols based on the signal quality of the detected symbols.

12. The apparatus of claim 1, wherein the at least one processor is configured to select a rate for data transmission based on the signal quality of the detected symbols.

13. The apparatus of claim 1, wherein the at least one processor is configured to determine the number of spatial channels to use for data transmission based on the signal quality of the detected symbols.

14. A method comprising:
  determining, with a processor, scaled errors for detected symbols based on a first function having higher resolution for small errors than large errors between the detected symbols and modulation symbols; and
  determining, with the processor, signal quality of the detected symbols based on the scaled errors by combining scaled errors for inphase (I) and quadrature (Q) components of the detected symbols to obtain combined scaled errors, averaging the combined scaled errors to obtain an average scaled error, determining a signal quality estimate based on the average scaled error, and utilizing a second function having non-linearity to compensate for the first function.

15. The method of claim 14, wherein the first function is a square root function of errors between the detected symbols and nearest modulation symbols.

16. An apparatus comprising:
  means for determining scaled errors for detected symbols based on a first function having higher resolution for small errors than large errors between the detected symbols and modulation symbols;
  means for determining signal quality of the detected symbols based on the scaled errors;
  means for combining scaled errors for inphase (I) and quadrature (Q) components of the detected symbols to obtain combined scaled errors;
  means for averaging the combined scaled errors to obtain an average scaled error;
  means for determining a signal quality estimate based on the average scaled error; and
  means for determining the signal quality of the detected symbols based on a second function having non-linearity to compensate for the first function.

17. The apparatus of claim 16, wherein the first function is a square root function of errors between the detected symbols and nearest modulation symbols.

18. The apparatus of claim 16, further comprising:
  means for storing a table of scaled error versus inphase or quadrature value for the detected symbols; and
  means for storing store a table of signal quality estimate versus average scaled error.

19. A non-transitory computer-readable medium including instructions stored thereon, comprising:
  a first instruction set for determining scaled errors for detected symbols based on a first function having higher resolution for small errors than large errors between the detected symbols and modulation symbols; and
  a second instruction set for determining signal quality of the detected symbols based on the scaled errors, said second instruction set further comprising code for combining scaled errors for inphase (I) and quadrature (Q) components of the detected symbols to obtain combined scaled errors, averaging the combined scaled errors to obtain an average scaled error, determining a signal quality estimate based on the average scaled error, and utilizing a second function having non-linearity to compensate for the first function.

* * * * *